(12) United States Patent
Rutschmann et al.

(10) Patent No.: US 6,192,850 B1
(45) Date of Patent: Feb. 27, 2001

(54) SUCTION SYSTEM

(75) Inventors: Erwin Rutschmann, Tiefenbronn; Armin Schweizer, Ditzingen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/283,275

(22) Filed: Apr. 1, 1999

(30) Foreign Application Priority Data

Apr. 3, 1998 (DE) .............................................. 198 14 970

(51) Int. Cl.[7] .................................................. F02M 35/10
(52) U.S. Cl. .................. 123/184.57; 123/184.51
(58) Field of Search ........................ 123/184.57, 184.51

(56) References Cited

U.S. PATENT DOCUMENTS

| | | | |
|---|---|---|---|
| 4,539,947 | * 9/1985 | Sawada et al. | 123/184.57 |
| 4,546,733 | * 10/1985 | Fukami et al. | 123/184.57 |
| 4,846,117 | 7/1989 | Hitomi et al. | |
| 5,408,962 | 4/1995 | Tallio et al. | 123/184.55 |
| 5,479,885 | * 1/1996 | Ausiello et al. | 123/184.57 |
| 5,628,287 | * 5/1997 | Brackett et al. | 123/184.57 |
| 5,894,823 | * 4/1999 | Lee | 123/184.57 |

FOREIGN PATENT DOCUMENTS

| | | |
|---|---|---|
| 36 33 929 | 4/1988 | (DE) . |
| 0 065 076 | 11/1982 | (EP) . |
| 0 255 059 | 2/1988 | (EP) . |
| 60-230510 | 11/1985 | (JP) . |
| 61-98918 | 5/1986 | (JP) . |
| 05001546 | 1/1993 | (JP) . |

OTHER PUBLICATIONS

Heinz Dorsch et al., Der 3, 6–Liter–Doppelzuendungsmotor Des Porsche Carrera 4, MTZ Motortechnische Zeitschrift 50, 1989, pp. 45–48.

* cited by examiner

*Primary Examiner*—Noah P. Kamen
*Assistant Examiner*—Jason Benton
(74) *Attorney, Agent, or Firm*—Evenson, McKeown, Edwards & Lenahan, P.L.L.C.

(57) ABSTRACT

A suction system for an internal-combustion engine has an arrangement for utilizing resonance effects. The arrangement includes a control device which is arranged inside the resonance container and by way of which the resonance cross-section can be varied as a function of parameters of the internal-combustion engine.

15 Claims, 6 Drawing Sheets

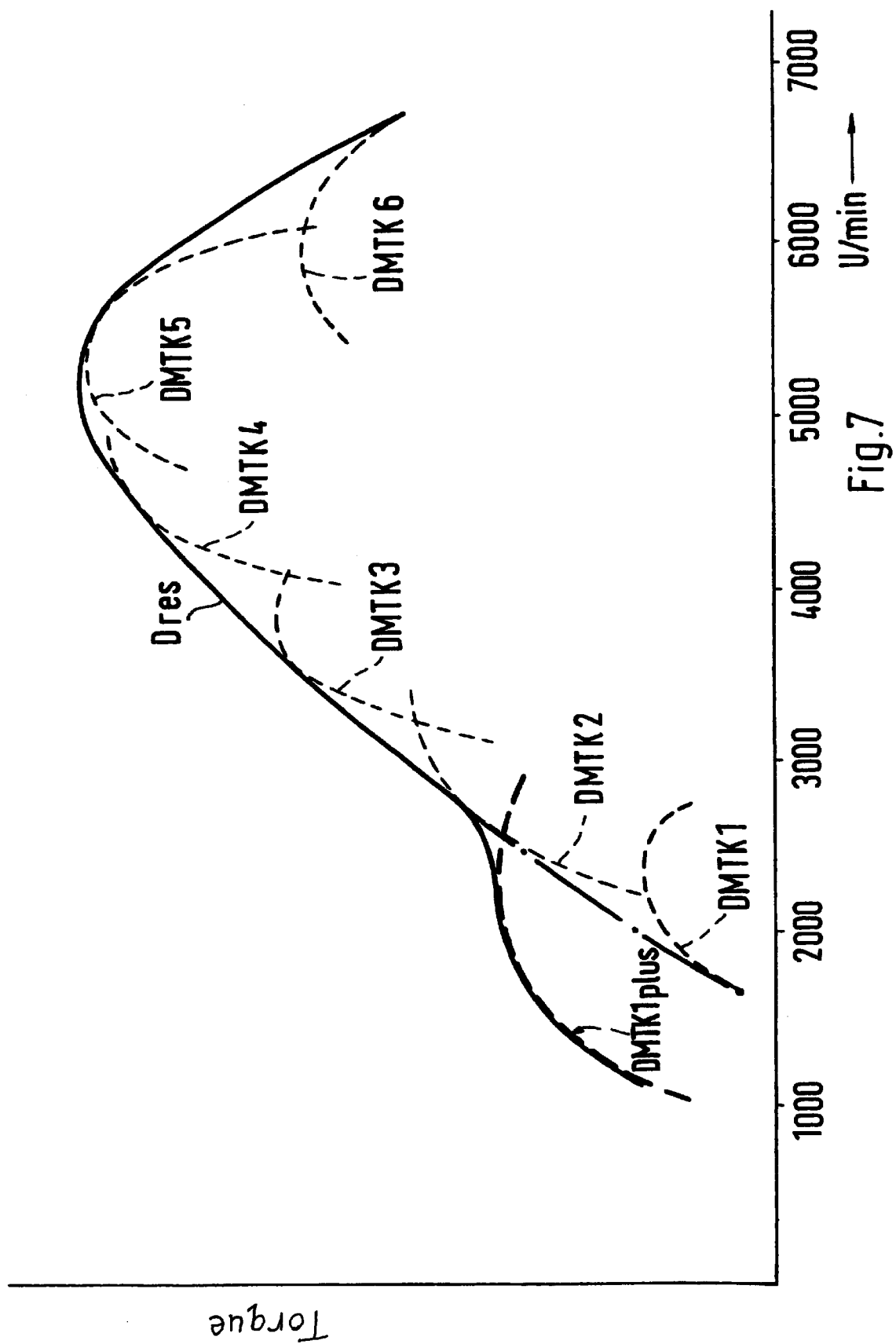

SUCTION SYSTEM

BACKGROUND AND SUMMARY OF THE INVENTION

This application claims the priority of German patent 198 14 970.0, filed Apr. 3, 1998, the disclosure of which is expressly incorporated by reference herein.

The invention relates to a suction system having an arrangement for utilizing resonance effects for an internal-combustion engine with opposed cylinder banks, which suction system comprises a resonance container which has boundary walls and which, on the one side is connected with the atmosphere and, on the other side, is connected with cylinders of the internal-combustion engine.

German Patent Document DE 36 33 929 C2 discusses several possibilities for achieving resonance effects for internal-combustion engines. It is explained in that document that, by coordinating the length and the cross-section of an intake pipe with the respective internal-combustion engine, the torque and the power of the engine can be optimized.

U.S. Pat. No. 4,846,117 shows a suction system with a container in which a ring duct is provided. By way of this ring duct, opposite cylinder banks are supplied with intake air.

U.S. Pat. No. 5,408,962 describes a suction system whose container is connected to two length-variable feed pipes. By means of this construction, a resonance matching is achieved in the lower and the medium rotational speed range.

Finally, European Patent Document EP 0 065 076 B1 discloses an intake system whose own frequency can be continuously adjusted, whereby the effect of the tuned intake pressure charging can be utilized over the whole rotational speed range.

It is an object of the invention to provide a specific suction system for an internal-combustion engine by means of which a torque optimization can be carried out over a significant rotational speed range.

This and other objects have been achieved according to the present invention by providing a suction system for utilizing resonance effects for an internal-combustion engine with opposed cylinder banks, said suction system comprising: a resonance container formed by a plurality of boundary walls, an interior of said resonance container being communicated with the atmosphere and being communicated with cylinders of the internal-combustion engine; and a control device arranged inside the resonance container, said control device including a plurality of guide walls extending at a distance from the boundary walls of the resonance container, said control device being movable to vary a resonance cross-section of said resonance container.

Certain principal advantages achieved by the invention are that the resonance cross-section in the resonance container can be varied by way of the control device such that resonance effects are obtained which lead to the improvement of the torque action of the internal-combustion engine. The control device can be integrated in a simple manner into the timing case, which has a prism-shaped basic form. In this case, the control device is a component which can be designed in a constructively clear manner and which can be moved linear continuously between a first end position and a second end position. In the first end position of the control device, its web wall forms a connection duct with a first front wall of the resonance container. At a low rotational speed of the internal-combustion engine, this connection duct forms a resonance pipe between two resonance volumes in the resonance container which are disposed in front of the opposite cylinder banks.

The control device has leg-type walls which are surrounded by receiving devices of the resonance container. These receiving devices form extensions of the resonance container and have a tube-shaped cross-section. Guiding devices are provided between the leg-type walls of the control device and the receiving devices of the resonance container.

A feeding device, which is equipped with an air filter, is connected to the resonance container, which feeding device can be constructed as a single feed pipe. A throttle valve is arranged in this feed pipe.

However, the feeding device may alternatively be formed as a pipe unit having two separate feed pipes which lead into the resonance container. A single pipe section is connected in front of these feed pipes, in which pipe section the throttle valve is arranged. In this construction, a shut-off flap is arranged in the connection duct of the resonance body. The shut-off flap is closed in the low rotational speed range and when the control device is completely brought in. Specifically in the low rotational speed range, this construction ensures an additional torque increase. The control device is operated by way of an adjusting device, specifically as a function of the rotational speed and/or the load. In this case, the adjusting device comprises a connecting rod which is connected with the control device. The connecting rod is operated by way of an electric motor. This electric motor interacts with the connecting rod by way of a worm gear.

Other objects, advantages and novel features of the present invention will become apparent from the following detailed description of the invention when considered in conjunction with the accompanying drawings.

BRIEF DESCRIPTION OF THE DRAWINGS

FIG. 7 is a diagram showing the efficiency of the suction system according to the invention.

DETAILED DESCRIPTION OF THE DRAWINGS

Figure 1:
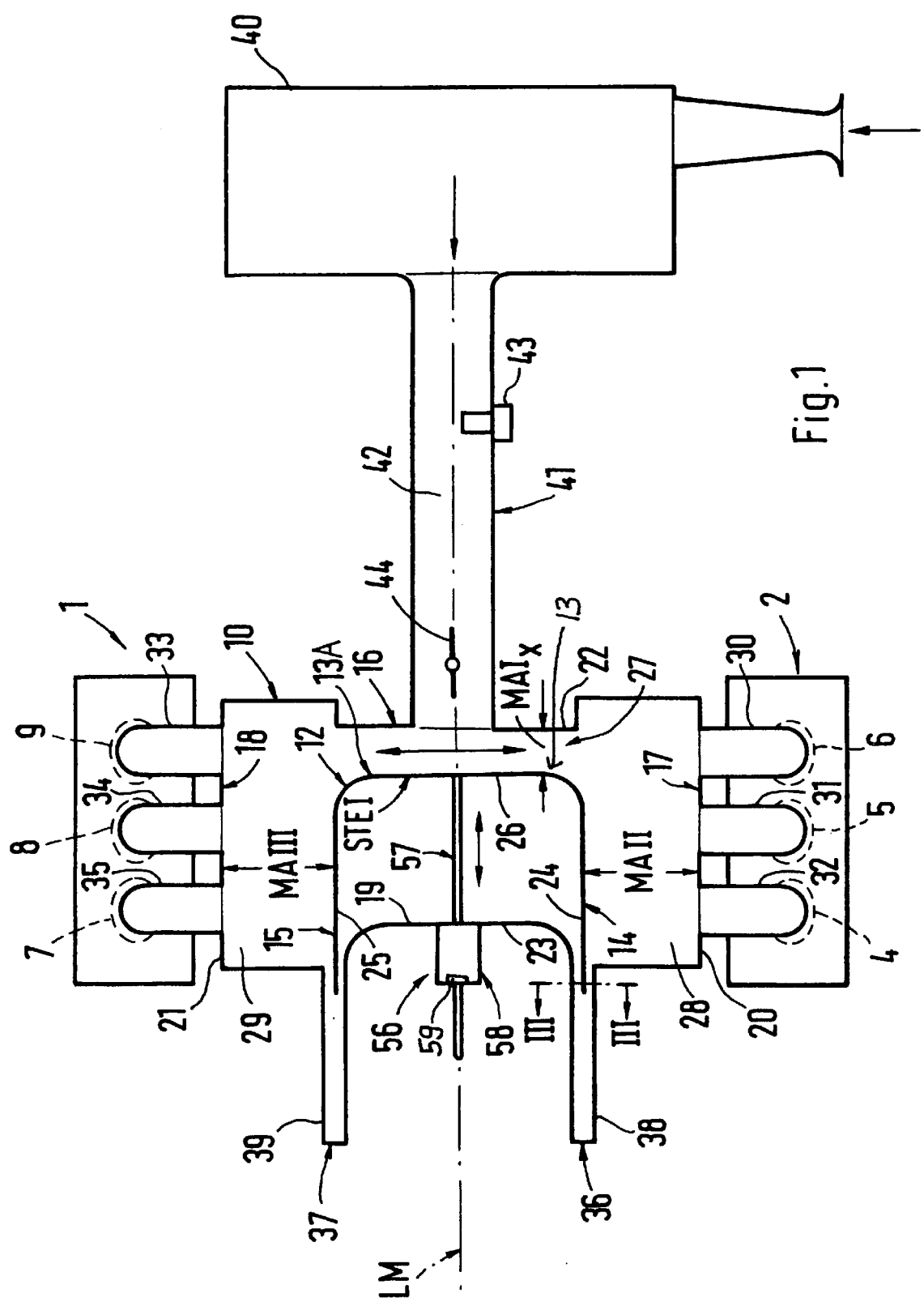
FIG. 1 is a schematic top view of an internal-combustion engine with a suction system according to a preferred embodiment of the present invention.

An internal-combustion engine 1 comprises opposed cylinder banks 2, 3 which are arranged with respect to one another in an opposite shape or a V-shape, specifically at a distance from a longitudinal center line LM of this engine. In the embodiment, each cylinder row 2, 3 has three cylinders 4, 5, 6 and 7, 8, 9 respectively. Between the cylinder banks 2 and 3, a suction system 10 is provided which supplies the cylinders 4, 5, 6 and 7, 8, 9 with air.

The suction system is equipped with an arrangement for utilizing resonance effects, as they are achieved by means of Helmholtz resonators—Bosch, Kraftfahrzeugtechnisches Taschenbuch, 22nd Edition, 1995, Page 379.

The arrangement comprises a control device 12 which is arranged in the interior of a resonance container 13 of the suction system 10 consisting of metal, plastic or the like. The resonance cross-section in the resonance container 13 can be varied by way of the control device 12, whereby a defined torque optimization of the internal-combustion engine 1 can be achieved.

The control device 12, which may also be made of metal, plastic or the like, has guide walls 13A, 14, 15 which extend at a distance—MA $I_x$, MA II and MA III (FIG. 1)—with respect to walls 16, 17, 18, 19 of the resonance container 13.

The resonance container 13 has a prism-type basic shape, its walls 17, 18 being constructed as longitudinal walls 20, 21 facing the cylinder banks 2 and 3 and as a first front wall 22 as well as a second front wall 23. The guide walls 13A, 14, 15 of the control device 12 extend in the same direction, preferably in parallel, with respect to the longitudinal walls 20, 21 and the front walls 22, 23.

The guide walls 13, 14, 15 have a U-shaped course, the leg-type walls having the reference numbers 24 and 25 and a web-type wall having the reference number 26.

Figure 2:
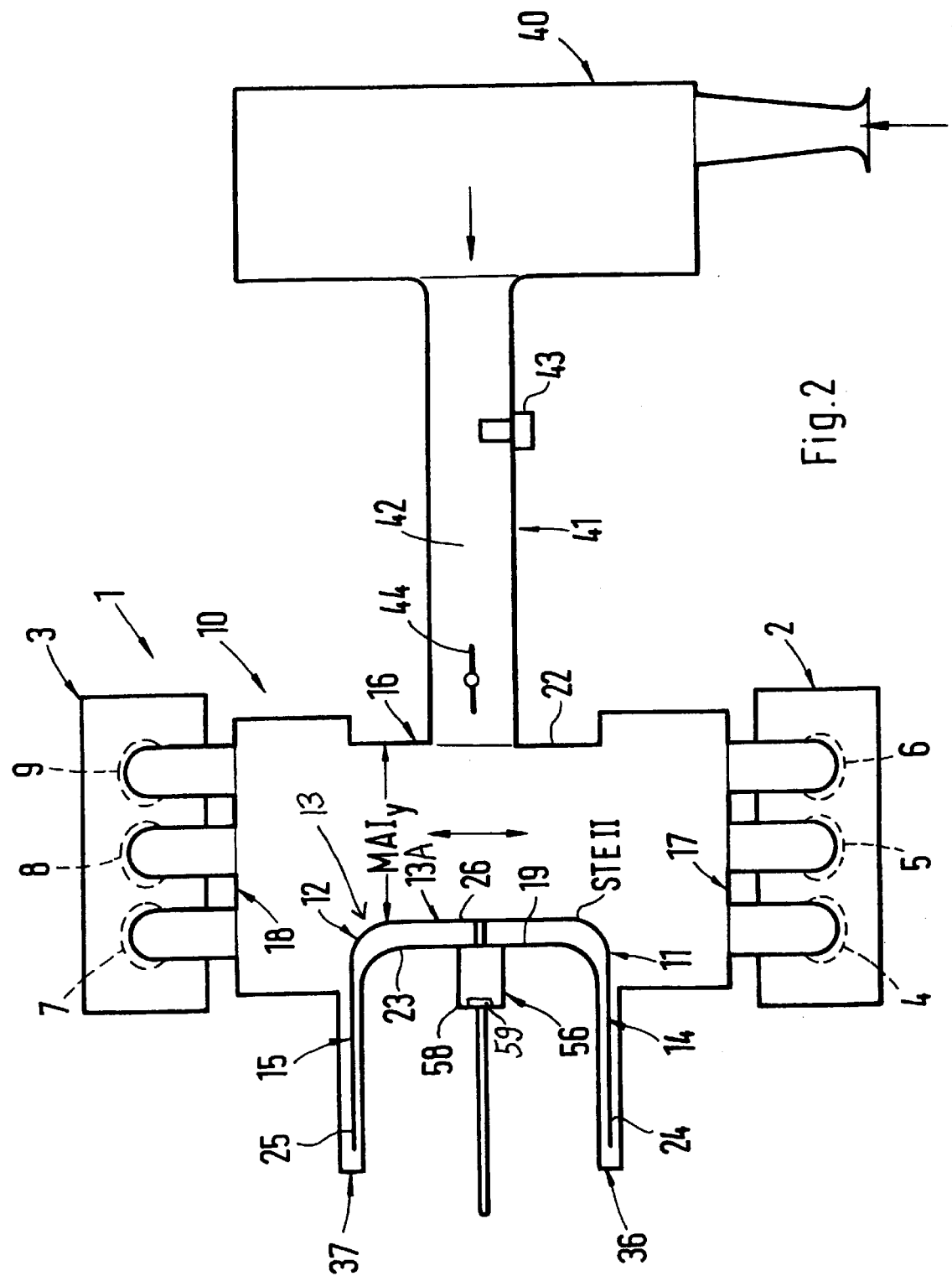
FIG. 2 is a view corresponding to FIG. 1 with the resonance container justed to have a different cross-section.

The control device 12 is constructed to be continuously adjustable between a first end position STE I—FIG. 1—and a second end position STE II—FIG. 2. The web-type wall 26 in the first end position STE I forming a connection duct 27 (FIG. 1) together with the first front wall 22. The connection duct 27 leads to a first resonance chamber 28 and to a second resonance chamber 29, which are disposed in front of the cylinder banks 2, 3.

On the sides facing the cylinder banks 2, 3, the resonance container 13 has pipe sections 30, 31, 32 and 33, 34, 35 which lead to the cylinders 4, 5, 6 and 7, 8, 9. These relatively short pipe sections are components of the resonance container 13.

Figure 3:
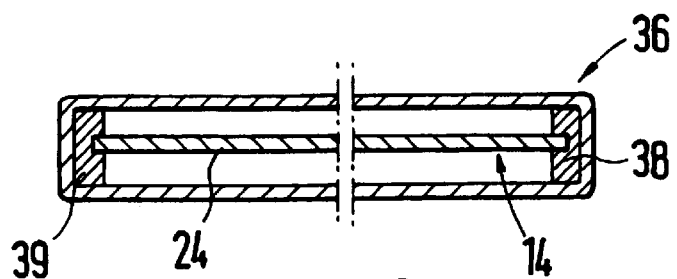
FIG. 3 is an enlarged sectional view according to Line III—III of FIG. 1.
Figure 4:
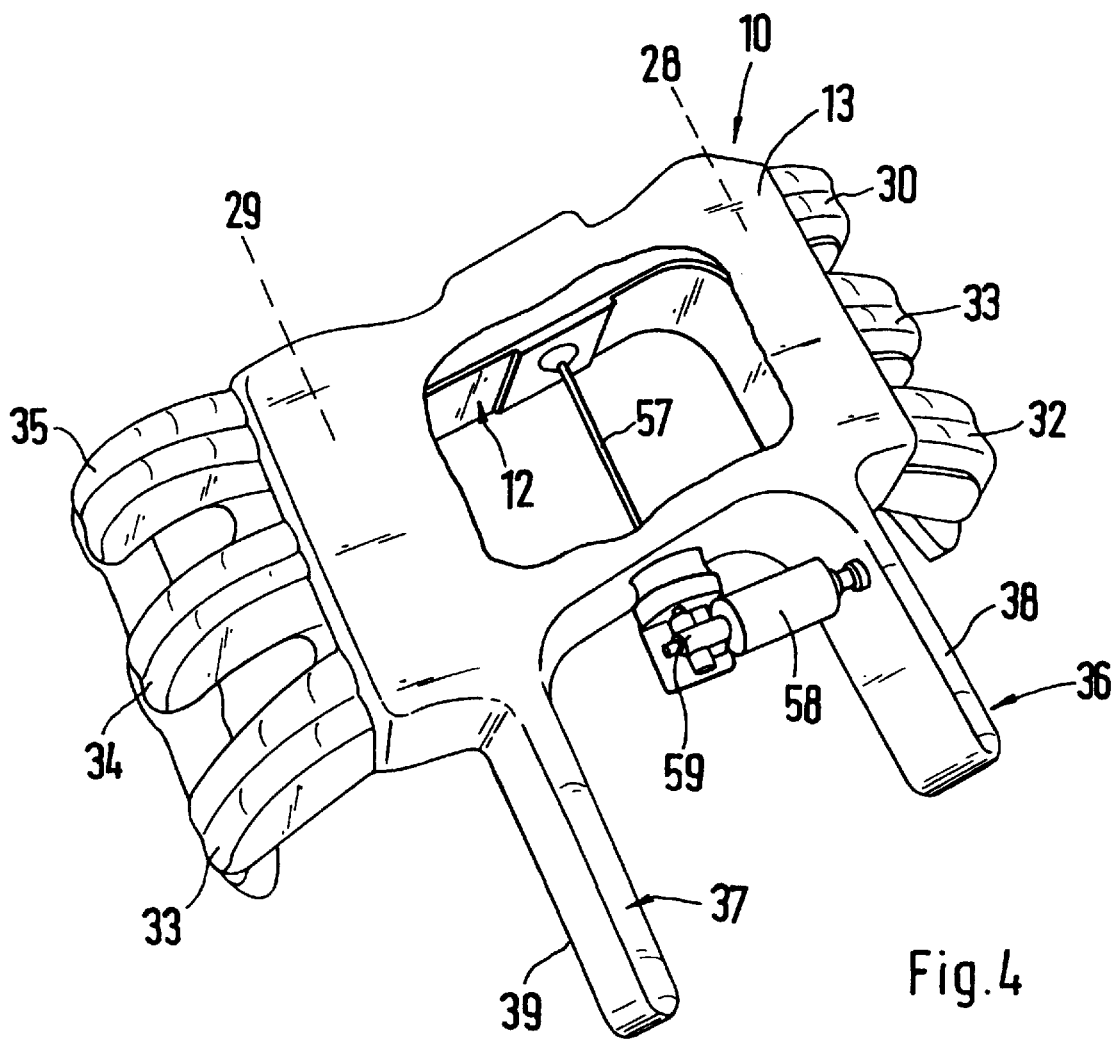
FIG. 4 is a partially cut-away perspective view from above of a concretely constructed suction system according to the present invention.

The leg-type walls 24, 25 of the control device 12 are surrounded by receiving devices 36, 37 of the resonance container 13. These receiving devices 36, 37 are extensions 38, 39 of the resonance container 13 and have a tube-shaped cross-section, as shown in FIG. 3. Between the leg-type walls 24, 25 and the receiving devices 36, 37, guiding devices 38, 39 are provided (see FIG. 3) which, in the illustrated embodiment, are fixedly connected with the receiving devices 36, 37.

The first front wall 22 of the resonance container 13 is provided with a feeding device 41 in which an air filter 40 is arranged. This feeding device 41 is represented as a single feed pipe 42, in which an air flow sensor 43 and a throttle valve 44 are arranged. The throttle valve 44 is situated closer to the connection duct 27 of the resonance container 13 than to the air filter 40.

Figure 5:
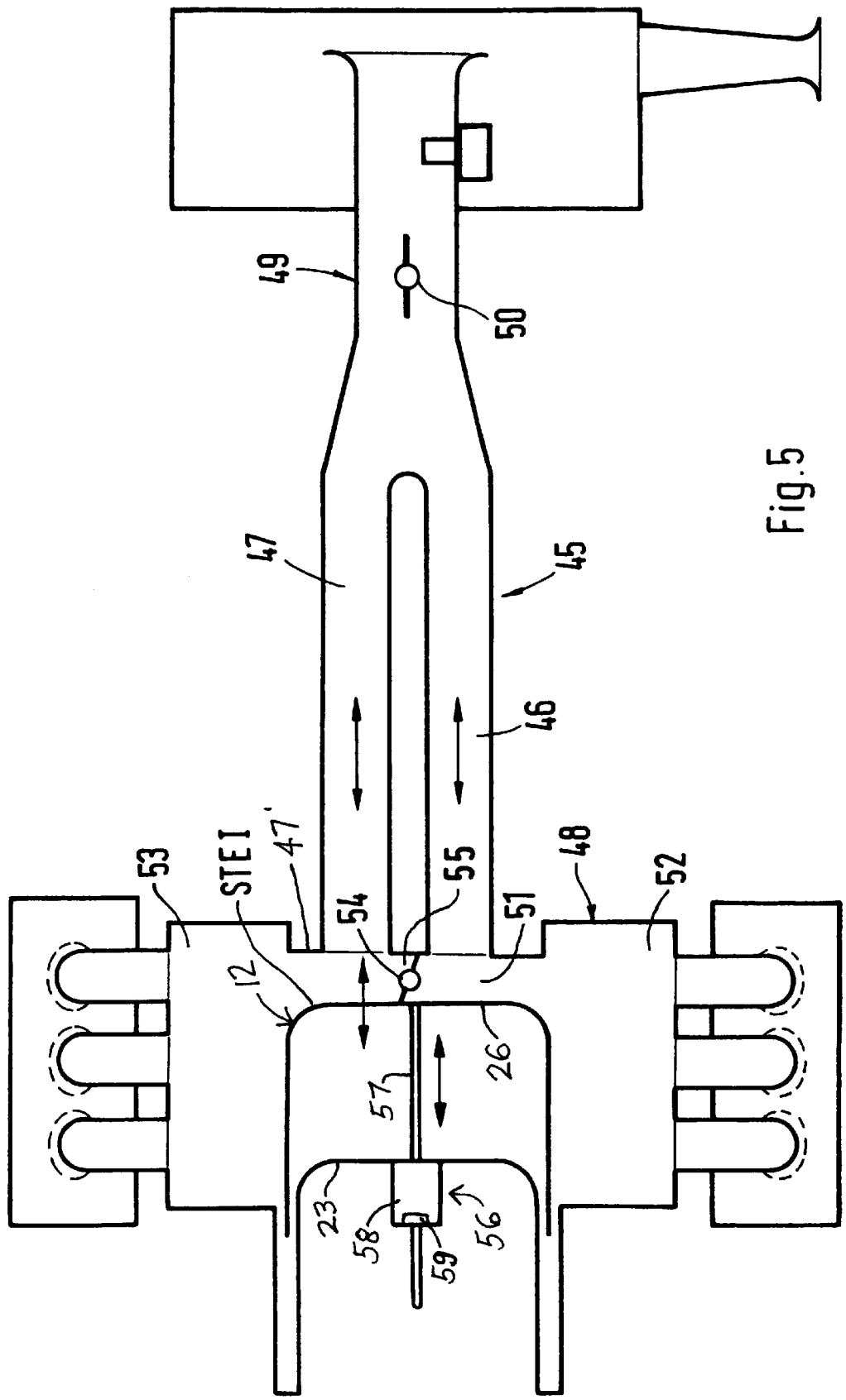
FIG. 5 is a schematic top view of an internal-combustion engine with a suction system according to another preferred embodiment of the present invention.
Figure 6:
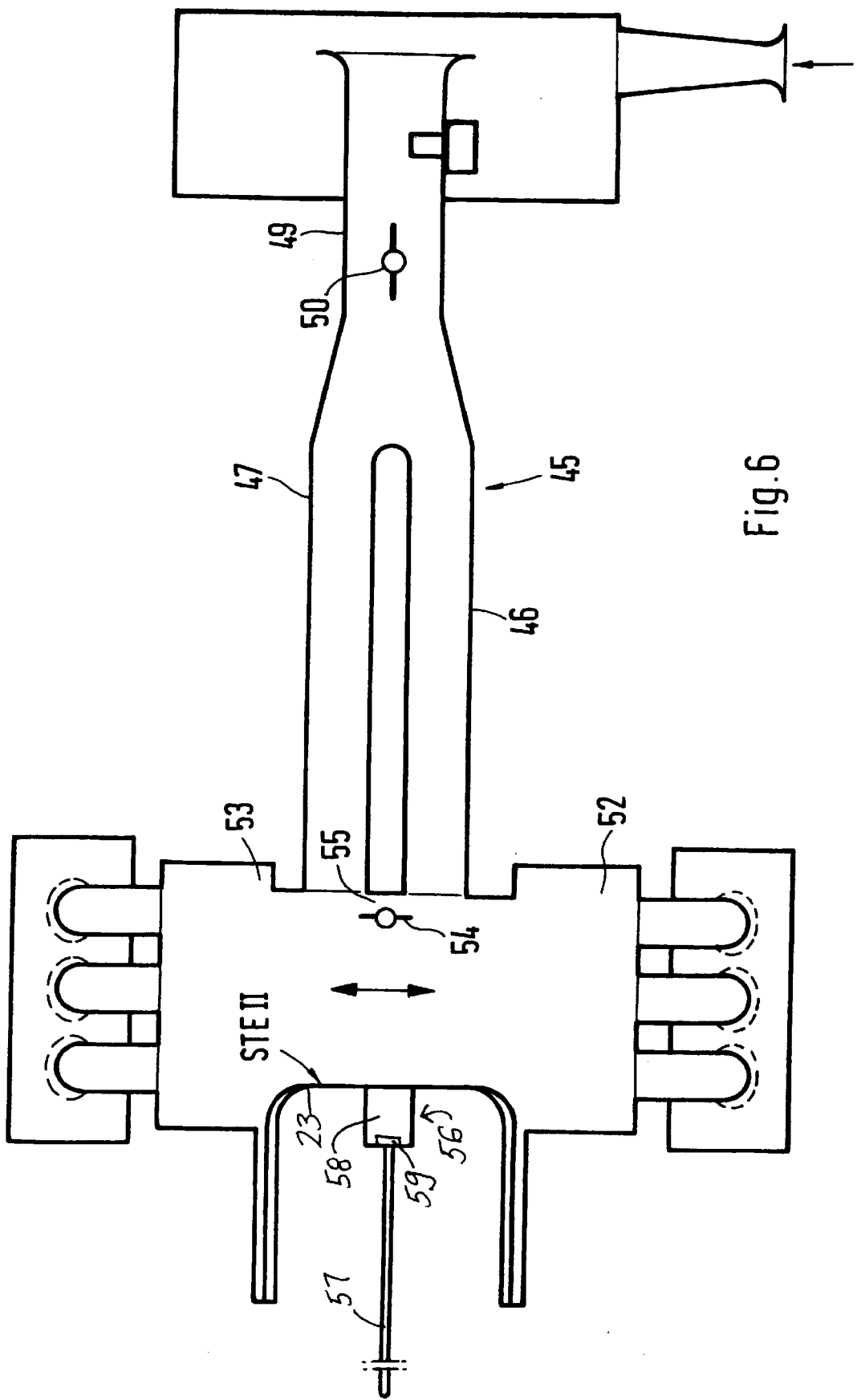
FIG. 6 is a view corresponding to FIG. 5 with the resonance container adjusted to have a different cross-section.

According to the embodiment show in FIG. 5 and 6, wherein the same reference numbers have been used to refer to elements corresponding to the embodiment of FIGS. 1–2, a feeding device 45 has two feed pipes 46, 47 which are separated in sections and which lead into the first front wall 47' of the resonance container 48. A single pipe section 49 is connected in front of the feed pipes 46, 47 and, together with the above-mentioned feed pipes, has a Y-shaped design. A throttle valve 50 is arranged in pipe section 49.

In addition, a shut-off flap 54 is provided in the connection duct 51 between the first resonance chamber 52 and the second resonance chamber 53 of the resonance container 48, whereby the connection between the resonance chambers 52, 53 can be interrupted. The shut-off flap 54 is arranged in an area 55 between the feed pipes 46, 47 and, in the low rotational speed range, interacts with the web-type wall 26 of the control device 12, as shown in FIG. 5.

Referring to FIGS. 1, 2 and 4–6, the control device 12 can be operated by way of an adjusting device 56. The adjusting device 56 comprises a lifting rod 57 and an electric motor 58. The lifting rod 57 is fixedly connected with the control device 12, whereas the electric motor 58 is arranged on the second front wall 23 but is arranged outside the resonance container 13. A worm gear 59 is provided between the electric motor 58 and the lifting rod 57. Instead of this rotating electric motor, a linear motor may also be used. The control device 12 operates as a function of parameters of the internal-combustion engine, preferably the rotational speed and the load (accelerator pedal position).

The method of operation of the suction system can be explained in a simple manner in conjunction with FIGS. 1, 2, 5, 6 and 7. During the operation of the internal-combustion engine in the low rotational speed range, the control device 12 takes up the first end position STE I, in which case the connection duct 27 acts between the first resonance chamber 28 and the second resonance chamber as a resonance pipe. When the throttle valve 44 is open, the control device 12 is moved by way of the adjusting device 56, as a function of the rotational speed and/or the load, toward the second position STE II, resulting in the partial torque curve DMTK 1. In the further course of movement of the control device 12 toward the second position STE II, the partial torque curves DMTK 2 to DMTK 4 are obtained.

This is illustrated in the diagram according to FIG. 7, in which the torque is entered on the ordinate and the rotational speed r.p.m. is entered on the abscissa. From these partial torque curves, a resulting torque curve of Dres is obtained which demonstrates that the torque action of the internal-combustion engine 1 is optimized because of the control device 12.

A further improvement of the torque action is achieved if the feeding device 45 has two separate feed pipes 46, 47 and the shut-off flap 54 is closed in the low rotational speed range, as shown in FIG. 5. In this operating state—when the throttle valve 50 is open—compressional vibrations occur in the feed pipes 46, 47 which form long resonance pipes and lead to the partial torque curve DTMK 1 plus. During a further adjustment of the control device 12 in the direction of the second end position STE II, the partial torque curves DMTK 2 to DMTK 6 are obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Suction system for utilizing resonance effects for an internal-combustion engine with opposed cylinder banks, said suction system comprising:

a resonance container formed by a plurality of boundary walls, an interior of said resonance container being communicated with the atmosphere and being communicated with cylinders of the internal-combustion engine; and a control device arranged inside the resonance container, said control device including a plurality of guide walls extending at a distance from the boundary walls of the resonance container, said control device being movable to vary a resonance cross-section of said resonance container;

wherein the resonance container has a prism-type basic shape with said boundary walls including a pair of longitudinal walls facing the cylinder banks, respectively, and a first front wall and a second front wall extending between said longitudinal walls, the guide walls of the control device extending parallel to said longitudinal walls and said front walls;

wherein the guide walls are formed by two parallel leg-type walls coupled by a web-type wall, said leg-type walls and said web-type wall forming a U-shape; and wherein the control device is adjustable between a first end position and a second end position, the web-type wall of the control device, at least in the first end position, together with the first front wall, defining a connection duct to a pair of resonance chambers in the resonance container which are disposed in front of the cylinder banks, respectively.

2. Suction system according to claim 1, wherein said resonance container is communicated with the atmosphere via a feeding device coupled to the first front wall, an air filter being arranged in said feeding device.

3. Suction system according to claim 2, wherein the feeding device comprises a single feed pipe in which a throttle valve is provided.

4. Suction system according to claim 1, wherein the control device is operated by way of an adjusting device.

5. Suction system according to claim 4, wherein the adjusting device is formed by a lifting rod of the control device and an electric motor which is arranged adjacent to the second front wall on the resonance container.

6. Suction system according to claim 5, wherein the electric motor interacts with the lifting rod by way of a worm gear.

7. Suction system according to claim 1, wherein the control device is adjusted as a function of the rotational speed of the internal-combustion engine.

8. Suction system according to claim 1, wherein the control device is adjusted as a function of at least one of the rotational speed and the load of the internal-combustion engine.

9. Suction system for utilizing resonance effects for an internal-combustion engine with opposed cylinder banks, said suction system comprising:

a resonance container formed by a plurality of boundary walls, an interior of said resonance container being communicated with the atmosphere and being communicated with cylinders of the internal-combustion engine; and a control device arranged inside the resonance container, said control device including a plurality of guide walls extending at a distance from the boundary walls of the resonance container, said control device being movable to vary a resonance cross-section of said resonance container;

wherein the resonance container has a prism-type basic shape with said boundary walls including a pair of longitudinal walls facing the cylinder banks, respectively, and a first front wall and a second front wall extending between said longitudinal walls, the guide walls of the control device extending parallel to said longitudinal walls and said front walls;

wherein the guide walls are formed by two parallel leg-type walls coupled by a web-type wall, said leg-type walls and said web-type wall forming a U-shape;

wherein the control device is adjustable between a first end position and a second end Position, the web-type wall of the control device, at least in the first end position, together with the first front wall, defining a connection duct to a pair of resonance chambers in the resonance container which are disposed in front of the cylinder banks, respectively;

wherein said resonance container is communicated with the atmosphere via a feeding device coupled to the first front wall, an air filter being arranged in said feeding device; and wherein the feeding device comprises a plurality of feed pipes which extend separately in sections and which lead into the first front wall of the resonance container.

10. Suction system according to claim 9, wherein the plurality of feed pipes are coupled to a single pipe section located upstream of the feed pipes, a throttle valve being arranged in said single pipe section.

11. Suction system according to claim 9, wherein a shut-off flap is provided in the connection duct in an area extending between the feed pipes.

12. Suction system for utilizing resonance effects for an internal-combustion engine with opposed cylinder banks, said suction system comprising:

a resonance container formed by a plurality of boundary walls, an interior of said resonance container being communicated with the atmosphere and being communicated with cylinders of the internal-combustion engine; and a control device arranged inside the resonance container, said control device including a plurality of guide walls extending at a distance from the boundary walls of the resonance container, said control device being movable to vary a resonance cross-section of said resonance container;

wherein the resonance container has a prism-type basic shape with said boundary walls including a pair of longitudinal walls facing the cylinder banks, respectively, and a first front wall and a second front wall extending between said longitudinal walls, the guide walls of the control device extending parallel to said longitudinal walls and said front walls;

wherein the guide walls are formed by two parallel leg-type walls coupled by a web-type wall, said leg-type walls and said web-type wall forming a U-shape; and wherein the leg-type walls of the control device are surrounded by corresponding receiving devices in the resonance container.

13. Suction system according to claim 12, wherein the receiving devices are formed by extensions of the resonance container.

14. Suction system according to claim 13, wherein the extensions have a tube-shaped cross-section.

15. Suction system according to claim 12, wherein guiding devices are provided between the leg-type walls and the receiving devices.

* * * * *